(12) United States Patent
Furuya et al.

(10) Patent No.: US 11,968,324 B2
(45) Date of Patent: Apr. 23, 2024

(54) SIGNAL TRANSMISSION SYSTEM AND SIGNAL TRANSMISSION METHOD

(71) Applicant: NIPPON TELEGRAPH AND TELEPHONE CORPORATION, Tokyo (JP)

(72) Inventors: Hiroyuki Furuya, Musashino (JP); Tomohiro Tokuyasu, Musashino (JP); Hayato Fukuzono, Musashino (JP); Yu Ono, Musashino (JP); Tsutomu Tatsuta, Musashino (JP); Tomohiro Nakayama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 284 days.

(21) Appl. No.: 17/629,986

(22) PCT Filed: Jul. 27, 2020

(86) PCT No.: PCT/JP2020/028690
§ 371 (c)(1),
(2) Date: Jan. 25, 2022

(87) PCT Pub. No.: WO2021/020341
PCT Pub. Date: Feb. 4, 2021

(65) Prior Publication Data
US 2022/0263948 A1  Aug. 18, 2022

(30) Foreign Application Priority Data
Jul. 29, 2019 (JP) .................................. 2019-138947

(51) Int. Cl.
*H04M 17/00* (2006.01)
*H04M 15/00* (2006.01)
(Continued)

(52) U.S. Cl.
CPC ..... *H04M 17/023* (2013.01); *H04M 15/8228* (2013.01); *H04W 4/24* (2013.01); *H04M 2017/246* (2013.01)

(58) Field of Classification Search
CPC .. H04M 17/023; H04M 15/8228; H04W 4/24
See application file for complete search history.

(56) References Cited

U.S. PATENT DOCUMENTS

| 6,728,367 | B1 * | 4/2004 | Swam | H04M 11/062 |
| | | | | 379/372 |
| 2005/0213738 | A1 * | 9/2005 | Rodman | H04M 3/567 |
| | | | | 379/202.01 |
| 2012/0189137 | A1 * | 7/2012 | Menke | H04R 5/04 |
| | | | | 381/365 |

FOREIGN PATENT DOCUMENTS

| JP | 2002247242 A | 8/2002 |
| JP | 200369745 A | 3/2003 |
| JP | 2006128952 A | 5/2006 |

* cited by examiner

*Primary Examiner* — Simon King
(74) *Attorney, Agent, or Firm* — Harness, Dickey & Pierce, P.L.C.

(57) ABSTRACT

In a signal transmission system for transmitting an analog signal, in which a billing signal is superposed on an audio signal, from a transmitting device to a receiving device, the transmitting device includes a separation unit configured to separate the audio signal from the analog signal, an AD conversion unit configured to perform AD conversion on the audio signal separated by the separation unit, a detection unit configured to detect the billing signal from the analog signal, a coding unit configured to encode the billing signal detected by the detection unit, and a transmission unit configured to transmit the audio signal subjected to the AD conversion by the AD conversion unit and the billing signal encoded by the coding unit to the receiving device, and the receiving device includes a reception unit configured to receive the audio
(Continued)

signal and the billing signal transmitted by the transmission unit, a DA conversion unit configured to perform DA conversion on the audio signal received by the reception unit, a decoding unit configured to decode the billing signal received by the reception unit, a conversion unit configured to convert the billing signal decoded by the decoding unit into an analog wave, and a combination unit configured to combine the audio signal subjected to the DA conversion by the DA conversion unit and the analog wave.

8 Claims, 6 Drawing Sheets

(51) Int. Cl.
    *H04M 17/02*     (2006.01)
    *H04W 4/24*     (2018.01)

SIGNAL TRANSMISSION SYSTEM AND SIGNAL TRANSMISSION METHOD

CROSS-REFERENCE TO RELATED APPLICATIONS

This application is a 371 U.S. National Phase of International Application No. PCT/JP2020/028690 filed on Jul. 27, 2020, which claims priority to Japanese Application No. 2019-138947, filed on Jul. 29, 2019. The entire disclosure of the above applications are incorporated herein by reference.

TECHNICAL FIELD

The present invention relates to a signal transmission system and a signal transmission method.

BACKGROUND ART

Some of subscriber-based signal transmission systems are configured to transmit a billing signal superposed on an audio signal, which is an analog signal, from a switching station to a subscriber station accommodating, for example, a public phone device with billing. Further, the fixed wireless access system (FWA) is known as a signal transmission system in which a base station connected to a switching station or the like performs wireless digital communication with a subscriber station.

For example, Patent Literature 1 discloses a wireless public phone system that includes a switching equipment connected to a public phone switching network, a base station connected to the switching equipment, a subscriber station that performs wireless communication with the base station, and a telephone connected to the subscriber station and configured to transmit an audio signal received by the subscriber station and a billing signal via different routes.

Further, Patent Literature 2 discloses a billing signal transmission system that includes a public terminal having a function of counting inserted coins and cards with respect to type and quantity and transmitting them, as stored coin information, to a subscriber station equipment. The subscriber station equipment has a function of transmitting, in response to the transmission of the stored coin information from the public terminal, it to a base station equipment. The base station equipment has a function of reproducing, based on the stored coin information from the subscriber station equipment, an appropriate billing signal for a coin storage signal from a host device.

Further, Patent Literature 3 discloses a wireless local loop (WLL) system in which a wireless public phone device includes a wireless terminal that performs wireless communication with a wireless base station and holds a billing signal pattern such as transmission time and frequency inherent to an original billing signal transmitted from a switching equipment, and further returns a reply message, generates a secondary billing signal based on the billing signal pattern, and transmits it to a public telephone.

CITATION LIST

Patent Literature

Patent Literature 1: Japanese Patent Laid-Open No. 2006-128952
Patent Literature 2: Japanese Patent Laid-Open No. 2003-069745
Patent Literature 3: Japanese Patent Laid-Open No. 2002-247242

SUMMARY OF THE INVENTION

Technical Problem

In order to digitize the audio signal that is an analog signal, Pulse Code Modulation (PCM) or the like is generally used, for example. Further, the billing signal is a sort of analog signal that is superposed on the audio signal during a call and transmitted by voltage inversion.

For example, in order to collectively digitize audio signals on which billing signals are superposed, an AD converter having a large dynamic range including all signal levels is required. Further, in order to reproduce digitized signals, a DA converter having a large dynamic range is required.

In the above-mentioned signal transmission system with billing, if the dynamic range in PCM is increased while the sound quality of audio signals is maintained, it will raise problems such that the cost increases because of the use of high-performance AD converter and the communication band is compressed due to an increase in the number of required bits.

In this case, there is a method for reducing the bit rate by using the audio compression technique, but this method will raise problems such as increase in processing delay and increase in calculation cost. In addition, if a non-audio signal is input to an audio codec, the sound quality may be deteriorated.

In general, when a high-compression audio codec is used, the processing delay tends to increase. Further, if processing to be performed on the billing signal, which is a non-audio signal, is the same as the processing on the audio signal, there will be a problem that delay and jitter of the billing signal become larger.

The present invention intends to provide a signal transmission system and a signal transmission method capable of efficiently transmitting the billing signal together with the audio signal.

Means for Solving the Problem

A signal transmission system according to one aspect of the present invention is a signal transmission system for transmitting an analog signal, in which a billing signal is superposed on an audio signal, from a transmitting device to a receiving device. The transmitting device includes a separation unit configured to separate the audio signal from the analog signal, an AD conversion unit configured to perform AD conversion on the audio signal separated by the separation unit, a detection unit configured to detect the billing signal from the analog signal, a coding unit configured to encode the billing signal detected by the detection unit, and a transmission unit configured to transmit the audio signal subjected to the AD conversion by the AD conversion unit and the billing signal encoded by the coding unit to the receiving device. The receiving device includes a reception unit configured to receive the audio signal and the billing signal transmitted by the transmission unit, a DA conversion unit configured to perform DA conversion on the audio signal received by the reception unit, a decoding unit configured to decode the billing signal received by the reception unit, a conversion unit configured to convert the billing signal decoded by the decoding unit into an analog wave, and a combination unit configured to combine the audio signal subjected to the DA conversion by the DA conversion unit and the analog wave.

Further, a signal transmission method according to one aspect of the present invention is a signal transmission method for transmitting an analog signal, in which a billing signal is superposed on an audio signal, from a transmitting device to a receiving device. The method includes a separation process for separating the audio signal from the analog signal, an AD conversion process for performing AD conversion on the separated audio signal, a detection process for detecting the billing signal form the analog signal, a coding process for encoding the detected billing signal, a transmission process for transmitting the AD-converted audio signal and the encoded billing signal to the receiving device, a reception process for receiving the transmitted audio signal and the transmitted billing signal, a DA conversion process for performing DA conversion on the received audio signal, a decoding process for decoding the received billing signal, a conversion process for converting the decoded billing signal into an analog wave, and a combination process for combining the DA-converted audio signal and the analog wave.

Effects of the Invention

According to the present invention, it is possible to efficiently transmit the billing signal together with the audio signal.

DESCRIPTION OF EMBODIMENTS

Figure 1:
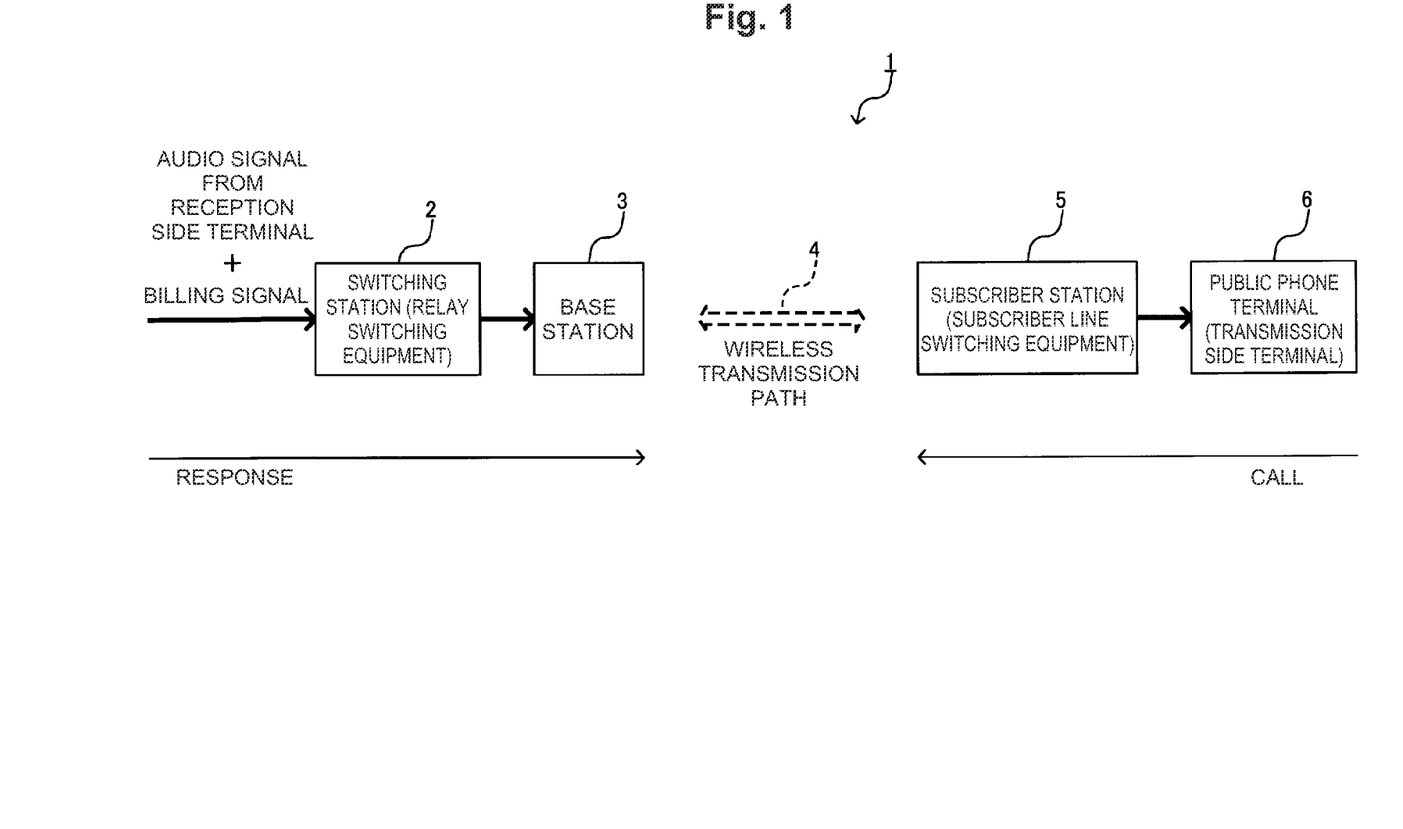
FIG. 1 is an exemplary diagram illustrating a schematic configuration of a signal transmission system according to an embodiment.

Hereinafter, an embodiment of a signal transmission system will be described with reference to attached drawings. FIG. 1 is an exemplary diagram illustrating a schematic configuration of a signal transmission system 1 according to an embodiment.

As illustrated in FIG. 1, the signal transmission system 1 is a fixed wireless access system in which a base station 3 connected to a switching station (relay switching equipment) 2 using, for example, an analog telephone line is connected to a subscriber station (subscriber line switching equipment) 5 via a wireless transmission path 4. The wireless transmission path 4 is a narrow-band wireless transmission path that transmits digital signals, although it may be replaced with a wired transmission path. The subscriber station 5 accommodates a public phone terminal 6 via the analog telephone line.

Further, the signal transmission system 1 enables the public phone terminal 6 to perform audio communication (phone call) with another telephone (terminal on the reception side), although it is not illustrated. For example, the signal transmission system 1 realizes a full-duplex audio communication, when the public phone terminal 6 makes a call to another telephone as a transmission side terminal, for transmitting a response from the other telephone to the public phone terminal 6.

Here, an exemplary case where the terminal on the transmission side is billed will be described. Specifically, a switching station 2 outputs an audio signal (response signal) which is an analog signal from the terminal on the reception side and a billing signal superposed on the audio signal to the base station 3.

The base station 3 converts the audio signal on which the billing signal is superposed into a digital signal, and transmits it to the subscriber station 5 via the wireless transmission path 4. The subscriber station 5 reproduces the audio signal and the billing signal, which are analog signals, from the digital signal received from the base station 3, and outputs them to the public phone terminal 6.

Hereinafter, focusing on the transmission of the audio signal on which the billing signal is superposed, signal transmission with the base station 3 serving as a transmitting device and the subscriber station 5 serving as a receiving device will be described.

Figure 2:
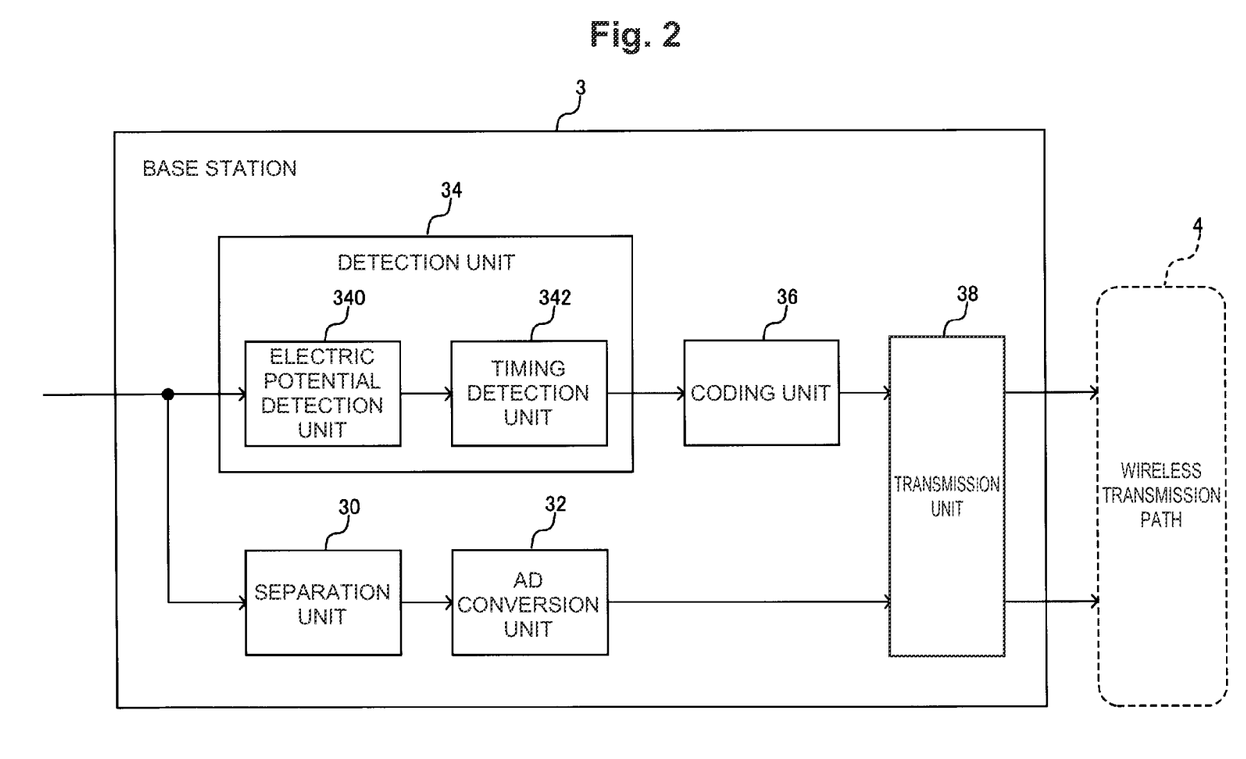
FIG. 2 is a diagram illustrating an exemplary configuration of a base station.
Figure 3:
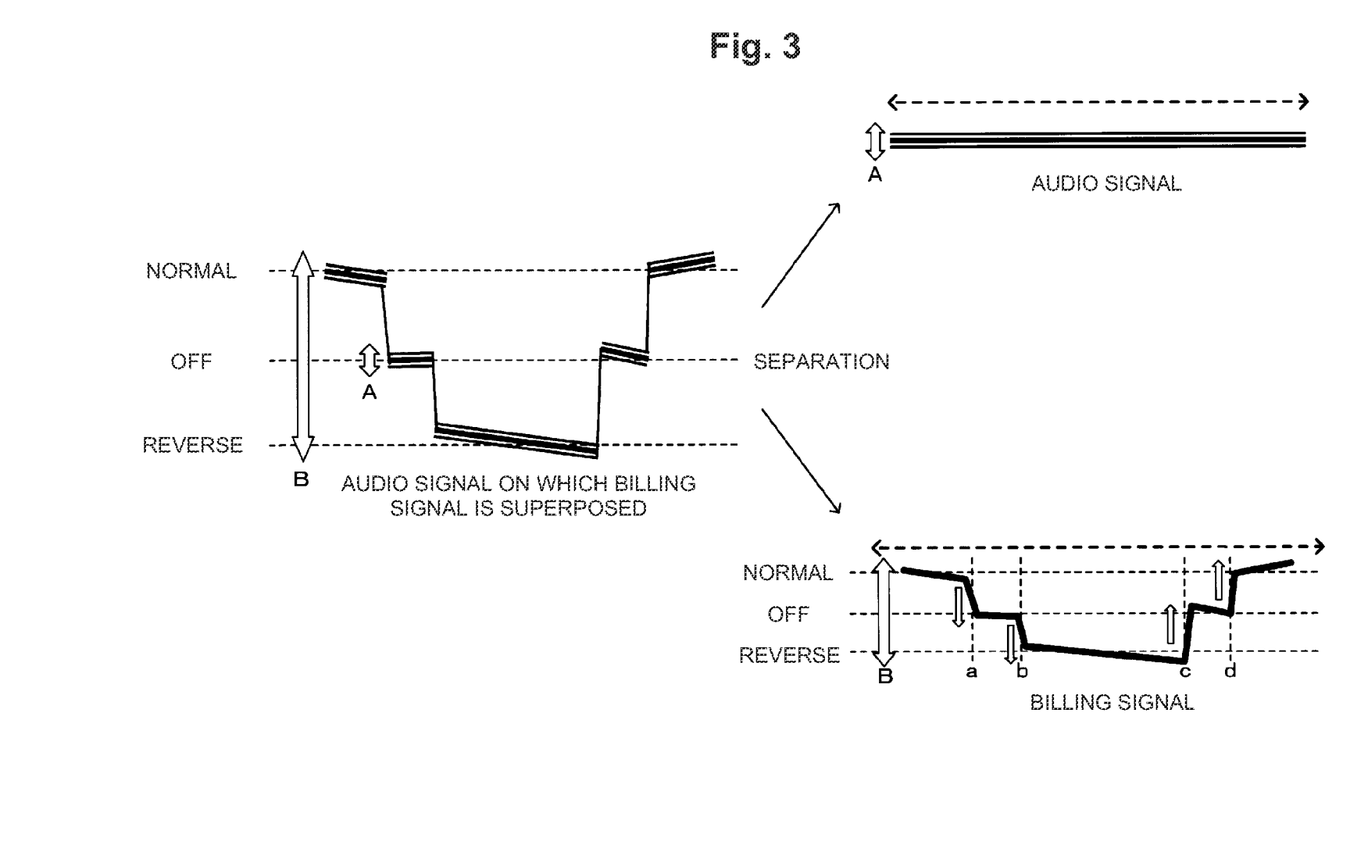
FIG. 3 is a diagram schematically illustrating signal processing that the base station performs.

FIG. 2 is a diagram illustrating an exemplary configuration of the base station 3. FIG. 3 is a diagram schematically illustrating signal processing that the base station 3 performs. As illustrated in FIG. 2, the base station 3 has a separation unit 30, an AD conversion unit 32, a detection unit 34, a coding unit 36, and a transmission unit 38.

The separation unit 30 separates the audio signal from the analog signal entered from the switching station 2, and outputs the separated audio signal to the AD conversion unit 32. The analog signal entered from the switching station 2 includes the billing signal superposed on the audio signal, as illustrated in FIG. 3. The analog signal entered from the switching station 2 contains some waveform distortion.

The audio signal is an analog signal that fluctuates within a range A illustrated in FIG. 3 and continuously changes with time. The billing signal is a signal including a polarity inversion pulse (timing information) whose polarity is reversed within a range B in such a way as to indicate three voltage levels of NORMAL, OFF (zero potential), and REVERSE states. That is, the separation unit 30 outputs the audio signal, which fluctuates within the range A that is narrower than the range B and necessary and sufficient for AD conversion of audio signals, to the AD conversion unit 32.

The AD conversion unit 32 performs AD conversion on the audio signal that fluctuates within the range A, and outputs the converted signal to the transmission unit 38. That is, the AD conversion unit 32 does not require the dynamic range of the range B, and it is satisfactory that the AD conversion unit 32 can perform AD conversion in the dynamic range of the range A.

The detection unit 34 has an electric potential detection unit 340 and a timing detection unit 342, detects the billing signal from the analog signal entered from the switching station 2, and outputs it to the coding unit 36. Specifically, the electric potential detection unit 340 detects, from the analog signal entered from the switching station 2, three electric potentials NORMAL, OFF, and REVERSE illustrated in FIG. 3. The timing detection unit 342 detects, for example, potential change timings a, b, c, and d illustrated in FIG. 3.

The coding unit 36 encodes the three electric potentials NORMAL, OFF, and REVERSE of the billing signal detected by the detection unit 34 and the potential change timings a, b, c, and d, and the like, and outputs them to the transmission unit 38.

The billing signal has a predetermined standard pattern. Therefore, it is unnecessary to transmit the waveform of the billing signal with the same granularity as the audio signal, and it is possible to accurately reproduce it on the receiving device side even at a coarse timing.

For example, the coding unit 36 may use up-down codes and the like when encoding the levels of three electric potentials NORMAL, OFF, and REVERSE, and may generate level state codes for the three electric potentials so that the error tolerance can be improved.

The transmission unit 38 transmits the digital audio signal that the AD conversion unit 32 has AD-converted and the billing signal that the coding unit 36 has encoded, for example, as an electric wave of a digital signal, to the subscriber station 5 via the wireless transmission path 4. The transmission unit 38 may transmit the audio signal and the billing signal individually, or may transmit the audio signal and the billing signal together by a common stream.

The base station 3 may be configured such that the separation unit 30 separates the audio signal and the billing signal and the detection unit 34 detects the billing signal separated by the separation unit 30.

Figure 4:
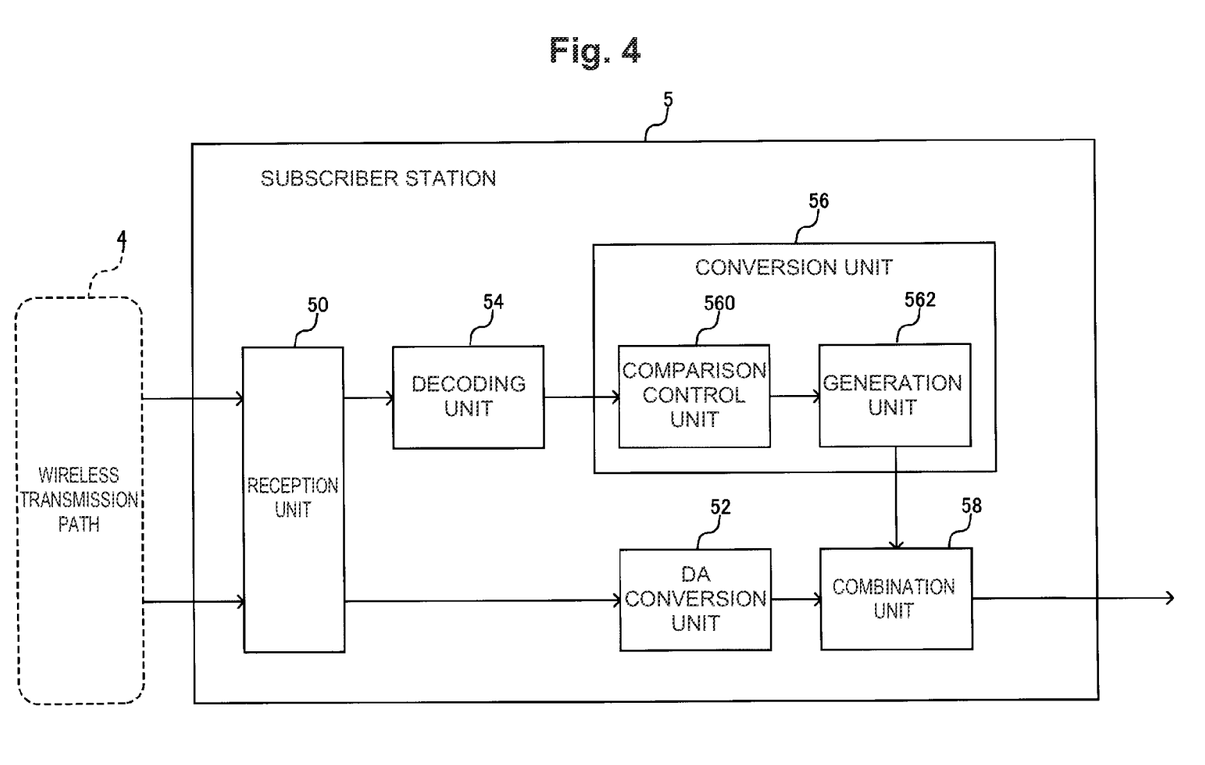
FIG. 4 is a diagram illustrating an exemplary configuration of a subscriber station.
Figure 5:
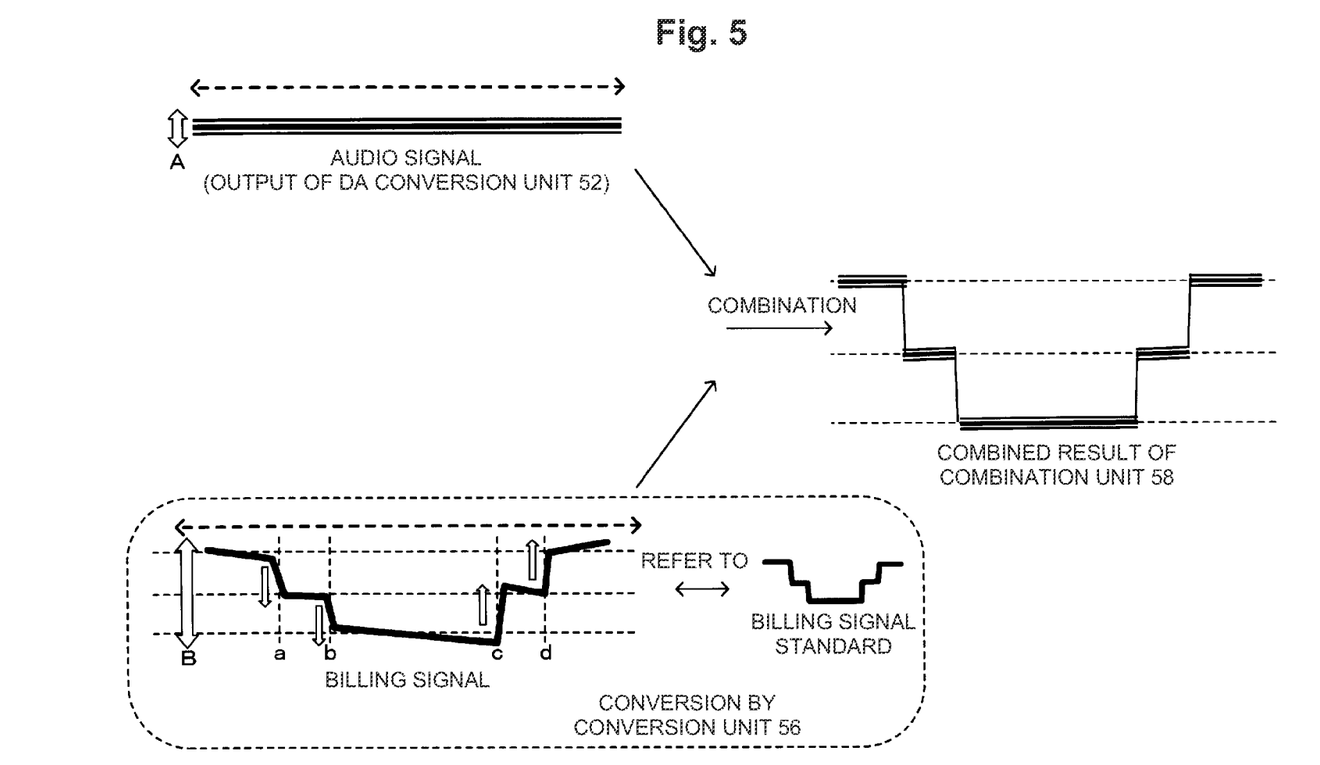
FIG. 5 is a diagram schematically illustrating signal processing that the subscriber station performs.

FIG. 4 is a diagram illustrating an exemplary configuration of the subscriber station 5. FIG. 5 is a diagram schematically illustrating signal processing that the subscriber station 5 performs. As illustrated in FIG. 4, the subscriber station 5 has a reception unit 50, a DA conversion unit 52, a decoding unit 54, a conversion unit 56, and a combination unit 58.

The reception unit 50 receives the audio signal and the billing signal transmitted by the base station 3 via the wireless transmission path 4, and outputs the received signals to the DA conversion unit 52 and the decoding unit 54. The reception unit 50 may have a function of outputting the audio signal to the DA conversion unit 52 and outputting the billing signal to the decoding unit 54.

The DA conversion unit 52 performs DA conversion on the audio signal entered from the reception unit 50 and outputs the converted signal to the combination unit 58. Here, the DA conversion unit 52 can DA-convert the audio signal within the range A narrower than the above-described range B.

The decoding unit 54 decodes the billing signal entered from the reception unit 50 and outputs the decoded signal to the conversion unit 56.

The conversion unit 56 has a comparison control unit 560 and a generation unit 562, and is configured to convert the billing signal decoded by the decoding unit 54 into an analog wave and output it to the combination unit 58. Specifically, the comparison control unit 560 performs control in such a way as to normalize the waveform of the billing signal by comparing and referring to the billing signal decoded by the decoding unit 54 and a billing signal standard determined in advance as illustrated in FIG. 5. The generation unit 562 generates a billing signal normalized according to the control of the comparison control unit 560.

The combination unit 58 combines the audio signal that the DA conversion unit 52 has DA-converted and the analog wave that the conversion unit 56 has converted, and outputs the combined result to the public phone terminal 6 via the analog telephone line. That is, since the combination unit 58 generates the billing signal normalized by the conversion unit 56, a signal in which the waveform distortion is corrected (the audio signal on which the billing signal is superposed) can be reproduced.

Next, a comparative example of the signal transmission system will be described. In the signal transmission system of the comparative example, a transmitting device collectively performs AD conversion on audio signals (analog signals) on which billing signals are superposed and performs digital transmission, while a receiving device reproduces an analog signal by performing DA conversion on the transmitted signal.

Figure 6:
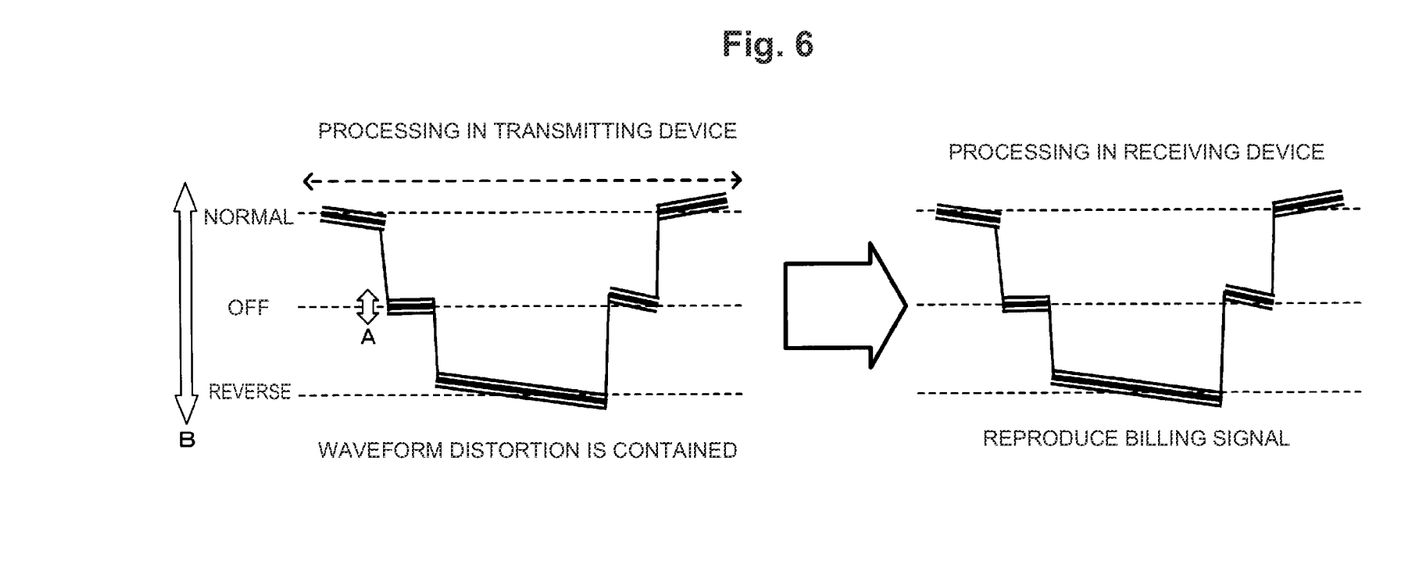
FIG. 6 is a diagram illustrating an analog signal that a transmitting device transmits and an analog signal reproduced by a receiving device, in a signal transmission system of a comparative example.

FIG. 6 is a diagram illustrating an analog signal (before AD conversion) that the transmitting device transmits and an analog signal (after DA conversion) reproduced after the receiving device has received the signal converted into a digital signal and transmitted, in the signal transmission system of the comparative example.

As illustrated in FIG. 6, in the signal transmission system of the comparative example, the transmitting device requires an AD converter that can perform AD conversion with a dynamic range of the range B wider than that of the range A that is necessary and sufficient for AD conversion of audio signals. Further, the AD converter applies the sampling period for audio signals to all the signals.

Further, in the signal transmission system of the comparative example, the receiving device requires a DA converter that can perform DA conversion with the dynamic range of the range B wider than that of the range A that is necessary and sufficient for DA conversion of audio signals.

In this case, the signal transmission system of the comparative example transmits, to the receiving device, all the data AD-converted by the transmitting device with the dynamic range of the range B. Therefore, the signal transmission system of the comparative example transmits a lot of data than the above-described signal transmission system 1, and accordingly requires a transmission band larger than the wireless transmission path 4.

Further, the analog signal that the receiving device reproduces is a signal that directly reproduces the original signal transmitted by the transmitting device, and therefore the waveform distortion is also directly reproduced.

As described above, the above-described signal transmission system 1 can reduce the dynamic range in PCM, and therefore the device cost can be reduced. In addition, the signal transmission system 1 can reduce the bit rate required for overall transmission, and therefore can efficiently transmit signals even when the transmission path is a narrow band.

Further, in the signal transmission system 1, the billing signal is generated by the subscriber station 5, which is positioned closely to the public phone terminal 6 than the switching equipment that transmits the billing signal and the like, and therefore the billing operation can be accurately performed, as compared with a case where the billing signal transmitted from the switching equipment and the like is directly transmitted.

Further, since the signal transmission system 1 can transmit the billing signal at the correct timing that does not depend on the framing timing for audio processing, the billing signal can be accurately transmitted.

Further, since the signal transmission system 1 separates the billing signal from the audio signal and transmits it, adding a function of confirming the delivery is also possible.

Further, in some conventional techniques, the base station reads all the billing signals, and subsequently encodes and transmits them. However, in this case, a delay corresponding to the billing code length is unavoidable, in principle. On the other hand, the signal transmission system 1 can perform sequential transmission without reading all the billing signals, and therefore the delay in signal transmission can be reduced.

That is, the above-described signal transmission system 1 performs AD conversion on the audio signal, after the audio signal is separated from the analog signal on which the billing signal is superposed, and transmits the converted signal. Therefore, the billing signal can be efficiently transmitted together with the audio signal.

Further, the signal transmission system 1 is not required to change the public phone terminal 6 from the existing configuration, and can perform billing processing more accurately than when transmitting the same distance as the wireless transmission path 4 by a metal wire.

REFERENCE SIGNS LIST 1 signal transmission system
2 switching station
3 base station
4 wireless transmission path
5 subscriber station
6 public phone terminal
30 separation unit
32 AD conversion unit
34 detection unit
36 coding unit
38 transmission unit
50 reception unit
52 DA conversion unit
54 decoding unit
56 conversion unit
58 combination unit
340 electric potential detection unit
342 timing detection unit
560 comparison control unit
562 generation unit

The invention claimed is:

1. A signal transmission system for transmitting an analog signal, in which a billing signal is superposed on an audio signal, from a transmitting device to a receiving device, wherein
the transmitting device includes:
a separation unit configured to separate the audio signal from the analog signal;
an AD conversion unit configured to perform AD conversion on the audio signal separated by the separation unit;
a detection unit configured to detect the billing signal from the analog signal;
a coding unit configured to encode the billing signal detected by the detection unit; and
a transmission unit configured to transmit the audio signal subjected to the AD conversion by the AD conversion unit and the billing signal encoded by the coding unit to the receiving device, and
the receiving device includes:
a reception unit configured to receive the audio signal and the billing signal transmitted by the transmission unit;
a DA conversion unit configured to perform DA conversion on the audio signal received by the reception unit;
a decoding unit configured to decode the billing signal received by the reception unit;
a conversion unit configured to convert the billing signal decoded by the decoding unit into an analog wave; and
a combination unit configured to combine the audio signal subjected to the DA conversion by the DA conversion unit and the analog wave.

2. The signal transmission system according to claim 1, wherein the detection unit detects the billing signal, by detecting a plurality of different electric potentials that the analog signal contains, and change timings of the electric potentials.

3. The signal transmission system according to claim 2, wherein the coding unit encodes the billing signal detected by the detection unit, in such a way as to indicate at least either level or up/down in the change timings of the electric potentials detected by the detection unit.

4. The signal transmission system according to claim 1, wherein the conversion unit converts the billing signal decoded by the decoding unit into the analog wave, in which waveform normalization that refers to a predetermined billing signal standard is performed.

5. A signal transmission method for transmitting an analog signal, in which a billing signal is superposed on an audio signal, from a transmitting device to a receiving device, the method comprising:
a separation process for separating the audio signal from the analog signal;
an AD conversion process for performing AD conversion on the separated audio signal;
a detection process for detecting the billing signal from the analog signal;
a coding process for encoding the detected billing signal;
a transmission process for transmitting the AD-converted audio signal and the encoded billing signal to the receiving device;
a reception process for receiving the transmitted audio signal and the transmitted billing signal;
a DA conversion process for performing DA conversion on the received audio signal;
a decoding process for decoding the received billing signal;
a conversion process for converting the decoded billing signal into an analog wave; and
a combination process for combining the DA-converted audio signal and the analog wave.

6. The signal transmission method according to claim 5, wherein the detection process detects the billing signal, by detecting a plurality of different electric potentials that the analog signal contains, and change timings of the electric potentials.

7. The signal transmission method according to claim 6, wherein the coding process encodes the detected billing signal, in such a way as to indicate at least either level or up/down in the detected change timings of the electric potentials.

8. The signal transmission method according to claim 5, wherein the conversion process converts the decoded billing signal into the analog wave, in which waveform normalization that refers to a predetermined billing signal standard is performed.

* * * * *